United States Patent
Tatsukawa (10) Patent No.: US 10,640,110 B2
(45) Date of Patent: May 5, 2020

(54) LANE KEEP ASSIST DEVICE

(71) Applicant: DENSO CORPORATION, Kariya, Aichi-pref. (JP)

(72) Inventor: Junpei Tatsukawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 197 days.

(21) Appl. No.: 15/739,131

(22) PCT Filed: Jun. 22, 2016

(86) PCT No.: PCT/JP2016/068461
§ 371 (c)(1),
(2) Date: Dec. 21, 2017

(87) PCT Pub. No.: WO2016/208608
PCT Pub. Date: Dec. 29, 2016

(65) Prior Publication Data
US 2018/0170377 A1 Jun. 21, 2018

(30) Foreign Application Priority Data
Jun. 26, 2015 (JP) .................................. 2015-128887

(51) Int. Cl.
*B60W 30/12* (2020.01)
*B62D 15/02* (2006.01)
(Continued)

(52) U.S. Cl.
CPC .......... *B60W 30/12* (2013.01); *B60W 40/103* (2013.01); *B60W 40/114* (2013.01);
(Continued)

(58) Field of Classification Search
CPC .. B60W 30/12; B60W 40/103; B60W 40/114; B60W 40/076; B62D 15/025; G08G 1/167
See application file for complete search history.

(56) References Cited

U.S. PATENT DOCUMENTS

| 5,765,116 A | * | 6/1998 | Wilson-Jones et al. ..................... B62D 15/025 701/41 |
| 2015/0298694 A1 | * | 10/2015 | Park ...................... B60W 30/12 701/41 |

(Continued)

FOREIGN PATENT DOCUMENTS

| GB | 2414815 A | * 12/2005 | .......... B60W 40/114 |
| JP | 2005-280368 A | 10/2005 | |
| JP | 2006-236238 A | 9/2006 | |

*Primary Examiner* — Dale W Hilgendorf
(74) *Attorney, Agent, or Firm* — Knobbe, Martens, Olson & Bear, LLP (57) ABSTRACT

According to a lane keep assist electronic control unit (LKAECU), a lane recognizer recognizes a driving lane in which the own vehicle is traveling. A target trajectory generator, a first adder, a feedforward steering angle calculator, a feedback steering angle calculator, a second adder, a feedforward torque calculator, a feedback torque calculator, and a third adder calculate demanded torque $\tau_{tgt}$ for controlling steering of the own vehicle so that deviation of the vehicle from the driving lane is suppressed. A road surface camber corrector detects a camber estimated angle $\theta_G$ which is a camber angle of a road surface of the driving lane in which the own vehicle is traveling. The road surface camber corrector detects drift of the own vehicle by calculating a yaw rate difference $\Delta\omega$. The road surface camber corrector corrects the demanded torque $\tau_{tgt}$ based on the camber estimated angle $\theta_G$ and the yaw rate difference $\Delta\omega$.

2 Claims, 6 Drawing Sheets

(51) Int. Cl.
*G08G 1/16* (2006.01)
*B60W 40/103* (2012.01)
*B60W 40/114* (2012.01)
*B60W 40/076* (2012.01)

(52) U.S. Cl.
CPC .......... *B62D 15/025* (2013.01); *G08G 1/167* (2013.01); *B60W 40/076* (2013.01)

(56) References Cited

U.S. PATENT DOCUMENTS

| 2016/0075334 A1* | 3/2016 | Terazawa | B62D 15/025 |
| | | | 701/41 |
| 2016/0096546 A1* | 4/2016 | Chia | B62D 15/025 |
| | | | 701/41 |

* cited by examiner

LANE KEEP ASSIST DEVICE

CROSS-REFERENCE TO RELATED APPLICATION

This application is the U.S. national phase of International Application No. PCT/JP2016/068461 filed Jun. 22, 2016 which designated the U.S. and claims priority to JP Patent Application No. 2015-128887 filed Jun. 26, 2015, the entire contents of which are hereby incorporated by reference.

TECHNICAL FIELD

The present invention relates to a lane keep assist device which keeps a state where a vehicle does not deviate from a travel lane.

BACKGROUND ART

A lane keep assist device which controls steering of a vehicle so that the vehicle does not deviate from a travel lane is known (see, for example, Patent Literature 1). The device keeps the vehicle in the travel lane regardless of a camber of a road surface of the travel lane by detecting the camber of the road surface of the travel lane and correcting an amount of steering control in accordance with the camber of the road surface.

CITATION LIST

Patent Literature

[PTL 1] JP 2006-236238 A

SUMMARY OF THE INVENTION

Technical Problem

However, there has been a problem where when the vehicle is traveling on a cambered road, it may be difficult to keep the vehicle in the travel lane only by making corrections based on a result of detection of the camber of the road surface of the travel lane.

The present invention has been made in view of such a problem, and an object of the present invention is to provide a technique for improving keeping performance for keeping a vehicle in a travel lane.

Solution to Problem

A lane keep assist device of the present invention for achieving the above object includes travel lane recognition means, control amount calculation means, camber angle detection means, drift detection means, and correction means.

The travel lane recognition means recognizes a travel lane in which the own vehicle is traveling. The control amount calculation means calculates an amount of steering control for controlling steering of the own vehicle so that deviation of the own vehicle from the travel lane recognized by the travel lane recognition means is suppressed. The camber angle detection means detects a road surface camber angle which is a camber angle of a road surface of the travel lane in which the own vehicle is traveling. The drift detection means detects drift of the own vehicle. The correction means corrects the amount of steering control on the basis of a result of detection by the camber angle detection means and a result of detection by the drift detection means.

The lane keep assist device thus configured of the present invention detects not only the road surface camber angle of the travel lane but also the drift of the own vehicle. On the basis of the road surface camber angle and the drift, the lane keep assist device of the present invention calculates the amount of steering control for controlling steering of the own vehicle so that deviation of the own vehicle from the travel lane is suppressed. This allows the lane keep assist device of the present invention to improve keep performance for suppressing deviation of the own vehicle from the travel lane and keeping the vehicle in the travel lane.

DESCRIPTION OF THE EMBODIMENTS

The following description discusses an embodiment of the present invention with reference to the drawings.

Figure 1:
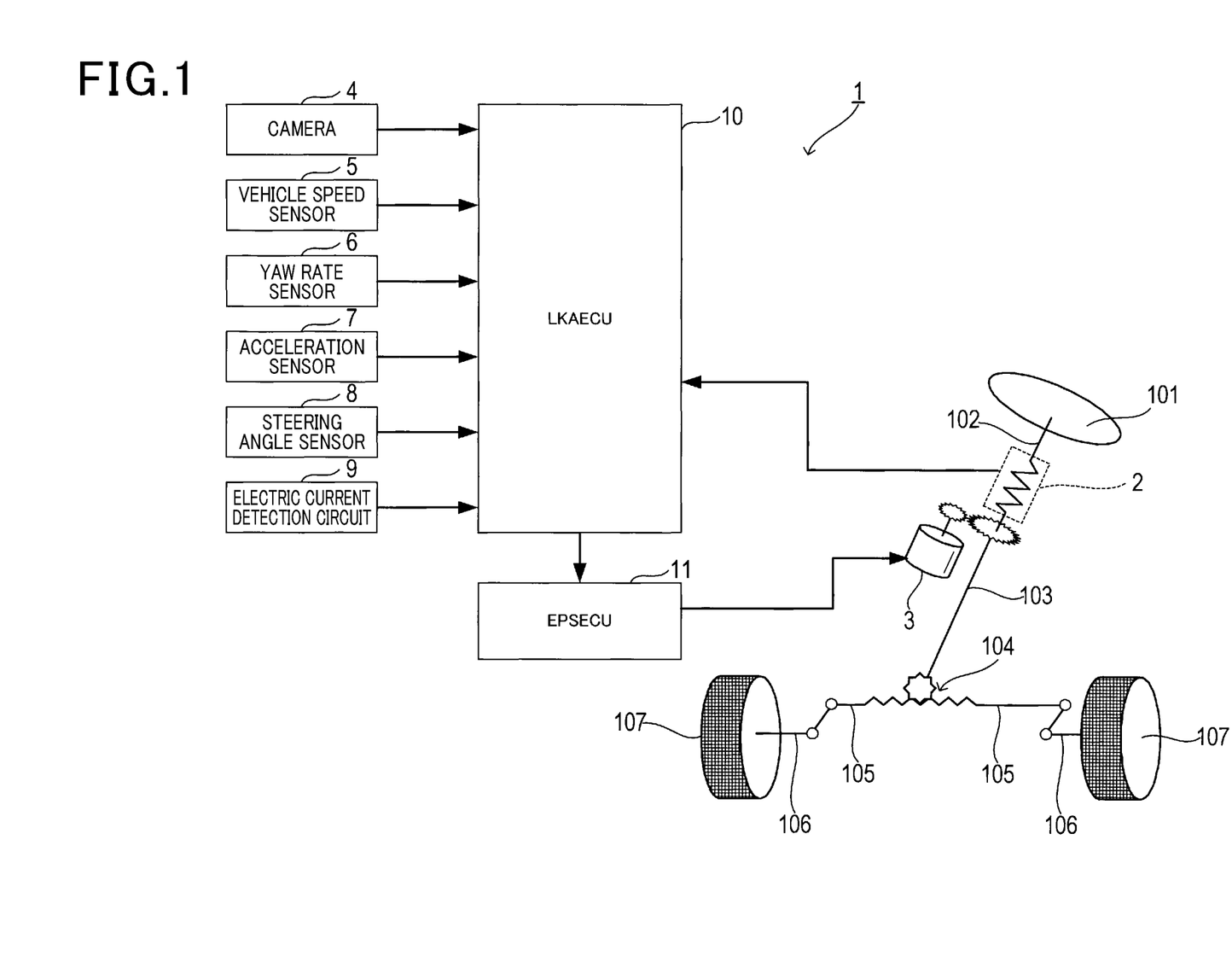
FIG. 1 is a view showing a schematic structure of a travel assist system.

As shown in FIG. 1, a travel assist system 1 of the present embodiment is mounted in a vehicle and includes a torque sensor 2, a motor 3, a camera 4, a vehicle speed sensor 5, a yaw rate sensor 6, an acceleration sensor 7, a steering angle sensor 8, an electric current detection circuit 9, a lane keep assist electronic control unit 10, and an electric power steering electronic control unit 11. In the following description, the lane keep assist electronic control unit 10 is referred to as LKAECU 10. The electric power steering electronic control unit 11 is referred to as EPSECU 11. The vehicle equipped with the travel assist system 1 is referred to as own vehicle.

When the own vehicle is likely to deviate from a lane, the travel assist system 1 performs control for avoiding the deviation.

A steering wheel 101 of the own vehicle is fixed to a first end of a steering shaft 102. A first end of the torque sensor 2 is fixed to a second end of the steering shaft 102, and a second end of the torque sensor 2 is fixed to a first end of an intermediate shaft 103.

The torque sensor 2 is a sensor for detecting steering torque. Specifically, the torque sensor 2 includes a torsion bar connecting the steering shaft 102 to the intermediate shaft 103 and on the basis of a torsion angle of the torsion bar, the torque sensor 2 detects torque applied to the torsion bar.

The motor 3 includes a worm gear at an end of a rotating shaft of the motor 3. The worm gear is engaged with a worm wheel mounted on the intermediate shaft 103. This causes rotation of the motor 3 to be transmitted to the intermediate shaft 103.

A second end of the intermediate shaft 103 is connected to a steering gearbox 104. The steering gearbox 104 is constituted by a gear mechanism made of a rack and a pinion gear. Teeth of the rack are engaged with the pinion gear mounted at the second end of the intermediate shaft 103. Accordingly, when a driver turns the steering wheel 101, the intermediate shaft 103 rotates (i.e., the pinion gear rotates), and this causes the rack to move left and right. At respective both ends of the rack, tie rods 105 are mounted and perform a reciprocating motion in a left-right direction together with the rack. Thus, the tie rods 105 pull and push knuckle arms 106 provided at respective ends of the tie rods 105, and this causes directions of respective tires 107 to be changed.

The camera 4 (not shown in detail) is mounted on a front side of the own vehicle. The camera 4 repeatedly captures a road surface ahead of the own vehicle and outputs image data indicating a captured image.

The vehicle speed sensor 5 detects a travel speed of the own vehicle and outputs a vehicle speed signal indicating a result of the detection. The yaw rate sensor 6 detects a yaw rate of the own vehicle and outputs a yaw rate signal indicating a result of the detection. The acceleration sensor 7 detects lateral acceleration of the own vehicle and outputs a lateral acceleration signal indicating a result of the detection. The steering angle sensor 8 detects a steering angle of the own vehicle and outputs a steering angle signal indicating a result of the detection. The electric current detection circuit 9 detects an electric current flowing in the motor 3.

The LKAECU 10 is mainly constituted by a well-known microcomputer made of a CPU, a ROM, a RAM, I/O, a bus line connecting these components, and the like. With use of a temporary storage function of the RAM, the CPU performs various processes on the basis of a program stored in non-transitory tangible storage media such as ROM. The LKAECU 10 performs calculation for avoiding deviation of the own vehicle from the lane, on the basis of information inputted from the torque sensor 2, the camera 4, the vehicle speed sensor 5, the yaw rate sensor 6, the acceleration sensor 7, the steering angle sensor 8, and the electric current detection circuit 9. On the basis of a result of the calculation, the LKAECU 10 outputs, to the EPSECU 11, demanded torque $\tau_{tgt}$ indicating torque that the LKAECU 10 demands from the motor 3.

The EPSECU 11 is mainly constituted by a well-known microcomputer made of a CPU, a ROM, a RAM, I/O, a bus line connecting these components, and the like. With use of a temporary storage function of the RAM, the CPU performs various processes on the basis of a program stored in non-transitory tangible storage media such as ROM. The EPSECU 11 causes the motor 3 to generate power for steering both of the tires 107 by applying to the motor 3 a drive voltage in accordance with the demanded torque τtgt from the LKAECU 10.

Figure 2:
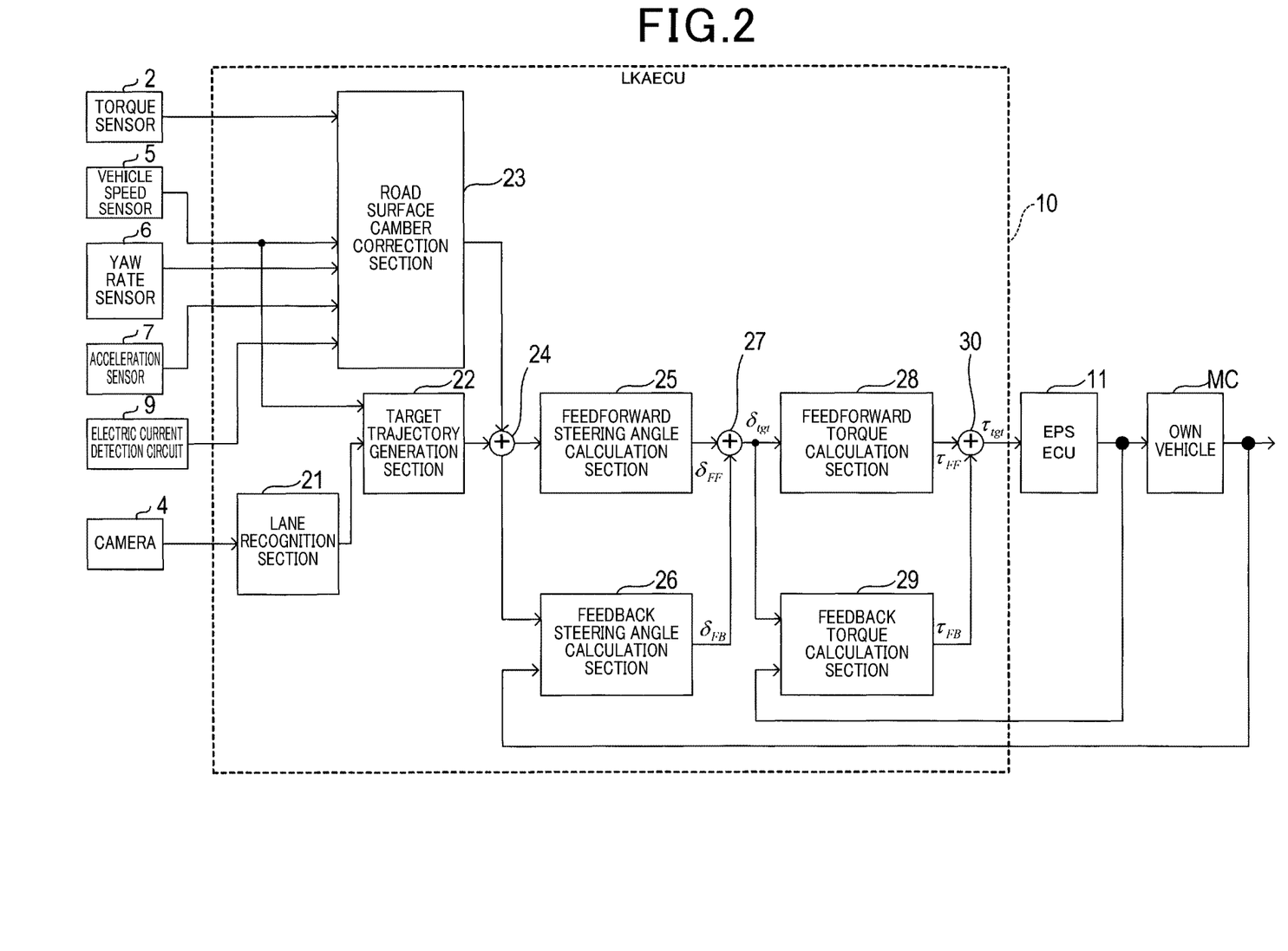
FIG. 2 is a block diagram showing a flow of a process performed by an LKAECU.

As shown in FIG. 2, the LKAECU 10 includes a lane recognition section 21, a target trajectory generation section 22, a road surface camber correction section 23, a first adder 24, a feedforward steering angle calculation section 25, a feedback steering angle calculation section 26, a second adder 27, a feedforward torque calculation section 28, a feedback torque calculation section 29, and a third adder 30.

By image processing of the image data inputted from the camera 4, the lane recognition section 21 recognizes a white line which divides into left and right sides a driving lane in which the own vehicle is traveling. The lane recognition section 21 then calculates a lateral position, a lateral speed, and a deviation angle of the own vehicle on the basis of a position at which the white line is shown in the image data.

The lateral position of the own vehicle is a position of the own vehicle in the driving lane along a direction perpendicular to a direction in which the driving lane extends. The lateral speed of the own vehicle is a movement speed of the own vehicle along the direction perpendicular to the direction in which the driving lane extends. The deviation angle is an angle at which a direction of travel of the own vehicle is shifted with respect to the direction in which the driving lane extends.

The target trajectory generation section 22 determines whether the own vehicle deviates from the driving lane, on the basis of the position of the white line recognized by the lane recognition section 21, the lateral position and the deviation angle of the own vehicle calculated by the lane recognition section 21, and the vehicle speed signal inputted from the vehicle speed sensor 5. When the target trajectory generation section 22 determines that the own vehicle deviates from the driving lane, the target trajectory generation section 22 starts generating target trajectory data on the basis of the lateral position and the deviation angle calculated by the lane recognition section 21 and a vehicle speed specified by the vehicle speed signal from the vehicle speed sensor 5.

Figure 3:
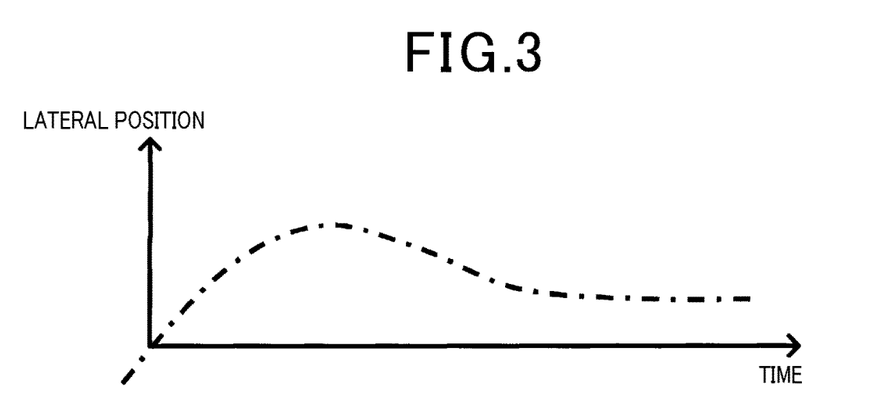
FIG. 3 is a view showing a target trajectory.

As shown in FIG. 3, the target trajectory is a trajectory which is set so that the direction of travel of the own vehicle is gradually changed from an outer side of the driving lane toward a center of the driving lane and the own vehicle eventually travels in a center of the driving lane. The target trajectory data includes a plurality of time periods based on a current time point, lateral positions indicating target trajectories corresponding to the respective plurality of time periods, a plurality of lateral speeds calculated corresponding to the respective plurality of lateral positions, and a plurality of rates of lateral acceleration calculated corresponding to the respective plurality of lateral positions.

As shown in FIG. 2, the road surface camber correction section 23 calculates a lateral acceleration correction value $a_{CAL}$ (described later) on the basis of information inputted from the torque sensor 2, the vehicle speed sensor 5, the yaw rate sensor 6, the acceleration sensor 7, and the electric current detection circuit 9. A method for calculating the lateral acceleration correction value $a_{CAL}$ is described later.

The first adder 24 outputs, to the feedforward steering angle calculation section 25 and the feedback steering angle calculation section 26, an additional value (hereinafter referred to as corrected lateral acceleration) obtained by adding, to the lateral acceleration correction value $a_{CAL}$ outputted from the road surface camber correction section 23, the lateral acceleration out of the lateral position, the lateral speed, and the lateral acceleration which constitute the target trajectory data outputted from the target trajectory generation section 22. Furthermore, the first adder 24 outputs, to the feedback steering angle calculation section 26, the lateral position and the lateral speed out of the lateral position, the lateral speed, and the lateral acceleration which constitute the target trajectory data outputted from the target trajectory generation section 22.

On the basis of an arithmetic expression indicating a relationship between the lateral acceleration and the steering angle, the feedforward steering angle calculation section 25 calculates a steering angle when the corrected lateral acceleration outputted from the first adder 24 acts on the own vehicle. The feedforward steering angle calculation section 25 then outputs the steering angle as a feedforward steering angle $\delta_{FF}$.

The feedback steering angle calculation section 26 calculates a feedback steering angle $\delta_{FB}$ for performing feedback control so that a lateral position, a lateral speed, and lateral acceleration of the own vehicle MC coincide with the lateral position, the lateral speed, and the lateral acceleration inputted from the first adder 24, respectively. The feedback steering angle calculation section 26 then outputs the feedback steering angle $\delta_{FB}$. The lateral position and the lateral speed of the own vehicle MC are calculated by the lane recognition section 21. The lateral acceleration of the own vehicle MC is calculated on the basis of the yaw rate detected by the yaw rate sensor 6 and the vehicle speed detected by the vehicle speed sensor 5.

The second adder 27 outputs, as a demanded steering angle $\delta_{tgt}$, an additional value obtained by adding the feedforward steering angle $\delta_{FF}$ outputted from the feedforward steering angle calculation section 25 to the feedback steering angle $\delta_{FB}$ outputted from the feedback steering angle calculation section 26.

The feedforward torque calculation section 28 converts the demanded steering angle $\delta_{tgt}$ outputted from the second adder 27 into torque and outputs the torque as feedforward torque $\tau_{FF}$. A relationship between the lateral acceleration and the torque (hereinafter referred to as lateral acceleration-torque conversion relationship) has been obtained in advance from vehicle specifications. The feedforward torque calculation section 28 calculates torque corresponding to the demanded steering angle $\delta_{tgt}$ on the basis of the lateral acceleration-torque conversion relationship and lateral acceleration corresponding to the demanded steering angle $\delta_{tgt}$. The lateral acceleration corresponding to the demanded steering angle $\delta_{tgt}$ is calculated by an arithmetic expression indicating a relationship between the lateral acceleration and the steering angle.

The feedback torque calculation section 29 calculates feedback torque $\tau_{FB}$ for performing feedback control so that the steering angle detected by the steering angle sensor 8 coincides with the demanded steering angle $\delta_{tgt}$ outputted from the second adder 27. The feedback torque calculation section 29 then outputs the feedback torque $\tau_{FB}$.

The third adder 30 outputs, to the EPSECU 11 as the demanded torque $\tau_{tgt}$, an additional value obtained by adding the feedforward torque $\tau_{FF}$ outputted from the feedforward torque calculation section 28 to the feedback torque $\tau_{FB}$ outputted from the feedback torque calculation section 29.

The EPSECU 11 controls the motor 3 on the basis of the demanded torque $T_{tgt}$ outputted from the third adder 30. This allows the own vehicle MC to travel along the target trajectory.

The following description discusses a road surface camber correction process performed by the road surface camber correction section 23.

Figure 4:
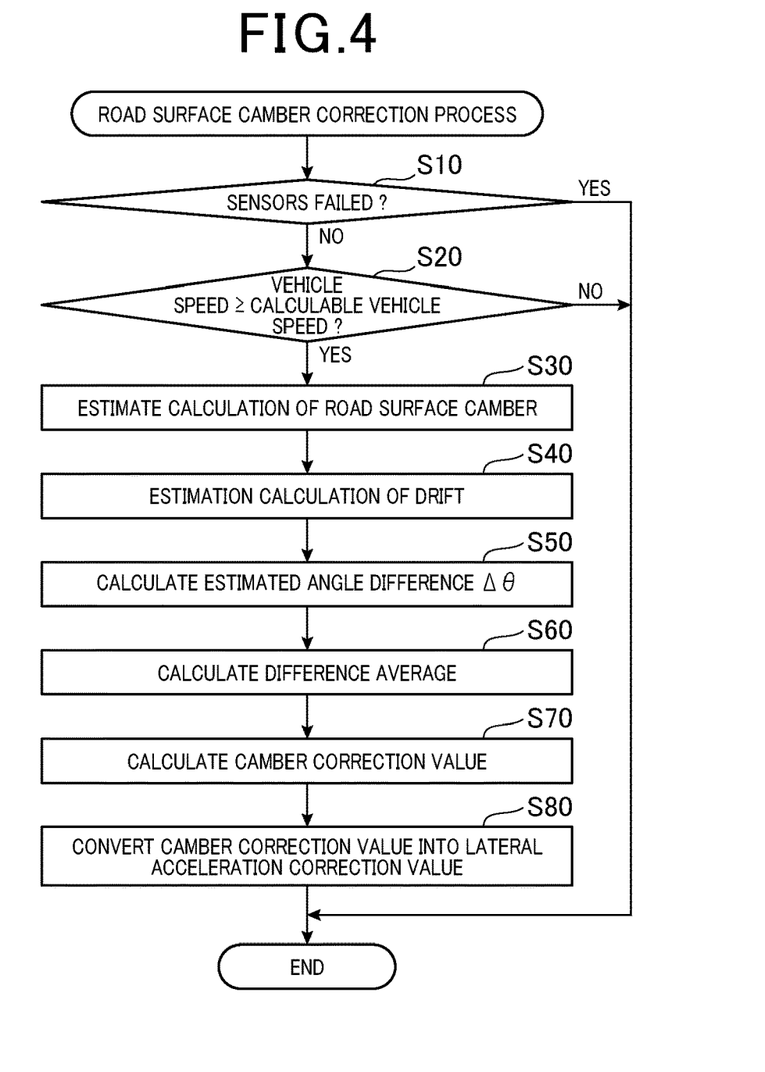
FIG. 4 is a flow chart showing a road surface camber correction process.

The road surface camber correction process is a process repeatedly performed during operation of the LKAECU 10.

When the road surface camber correction process is performed, as shown in FIG. 4, the CPU of the LKAECU 10 first in S10 determines whether sensors to be used for calculation are failed. The sensors to be used for calculation are the torque sensor 2, the vehicle speed sensor 5, the yaw rate sensor 6, the acceleration sensor 7, and the electric current detection circuit 9.

When the sensors to be used for calculation have failed (YES at S10), the road surface camber correction process ends once. Meanwhile, when the sensors to be used for calculation are not failed (NO at S10), it is determined in S20 whether a vehicle speed of the own vehicle is not less than a calculable vehicle speed (e.g., 40 km/h according to the present embodiment) which has been set in advance. When the vehicle speed of the own vehicle is less than the calculable vehicle speed (NO at S20), the road surface camber correction process ends once. Meanwhile, when the vehicle speed of the own vehicle is not less than the calculable vehicle speed (YES at S20), estimation calculation of a road surface camber is performed in S30.

Figure 5:
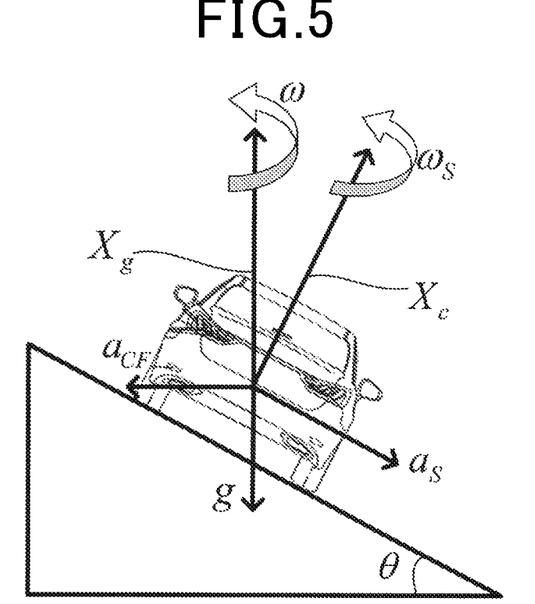
FIG. 5 is a rear view showing a vehicle traveling on an inclined a cambered road.

Note that v [m/s] and g [m/s$^2$] represent a vehicle speed and gravitational acceleration, respectively. As shown in FIG. 5, $\theta$ [rad], $a_{CF}$ [m/s$^2$], $\omega$ [rad/s], $\omega_S$ [rad/s], and $a_S$ [m/s$^2$] represent a camber angle, centrifugal acceleration, a yaw rate about a vertical axis Xg, a yaw rate about a vehicle vertical axis Xc, and lateral acceleration detected by the acceleration sensor 7, respectively. The yaw rate $\omega_S$ is a yaw rate detected by the yaw rate sensor 6.

When the own vehicle is performing steady-state circular turning at the vehicle speed v on a road relative to which the camber angle is $\theta$, the centrifugal acceleration $a_{CF}$, the yaw rate $\omega_S$, the lateral acceleration $a_S$ of the own vehicle are calculated by the following equations (1), (2), and (3), respectively. In the following equations (1), (2), and (3), it is assumed that a longitudinal gradient has little influence and the longitudinal gradient is thus ignored.

[Math. 1]

$$a_{CF} = v \cdot \omega \quad (1)$$

$$\omega_S = \omega \cos \theta \quad (2)$$

$$\begin{aligned} a_S &= a_{CF} \cos \theta - g \sin \theta \\ &= v \cdot \omega \cos \theta - g \sin \theta \\ &= v \cdot \omega_S - g \sin \theta \\ &= v \cdot \omega_S - g \sin \theta \end{aligned} \quad (3)$$

Thus, the camber angle $\theta$ is calculated by the following equation (4) with use of the vehicle speed v detected by the vehicle speed sensor 5, the yaw rate $\omega_S$ detected by the yaw rate sensor 6, and the lateral acceleration $a_S$ detected by the acceleration sensor 7.

[Math. 2]

$$\theta = \sin^{-1}\left(\frac{v \cdot \omega_S - a_S}{g}\right) \quad (4)$$

In S30, the camber angle $\theta$ calculated by the above equation (4) is calculated as a camber estimated angle $\theta_G$ obtained by the yaw rate sensor 6 and the acceleration sensor 7, and the process of S30 ends.

As shown in the above equation (2), on the road relative to which the camber angle is $\theta$, the yaw rate $\omega_S$ detected by the yaw rate sensor 6 is cos $\theta$ times greater than the yaw rate $\omega$ about the vertical axis Xg. That is, as the camber angle increases, the yaw rate $\omega_S$ decreases. Thus, when a turning radius of the road on which the own vehicle is traveling is estimated on the basis of the yaw rate detected by the yaw rate sensor 6, the estimated turning radius is greater than an actual turning radius.

Estimated lateral acceleration $a_E$ is calculated by the following equation (5), where $a_E$ [m/s$^2$] represents estimated lateral acceleration estimated from the yaw rate $\omega_S$ detected by the yaw rate sensor 6.

[Math. 3]

$$a_E = v \cdot \omega_S \quad (5)$$

According to the above equations (3) and (5), the estimated lateral acceleration $a_E$ estimated from the yaw rate $\omega_S$ is greater by $g\sim\sin\theta$ than the lateral acceleration $a_S$ detected by the acceleration sensor 7. That is, as the camber angle increases, a difference between the estimated lateral acceleration $a_E$ estimated from the yaw rate $\omega_S$ and the lateral acceleration $a_S$ detected by the acceleration sensor 7 increases.

Lateral acceleration $a_{CMB}$ is calculated by the following equation (6), where $a_{CMB}$ [m/s$^2$] represents lateral acceleration caused by the road surface camber.

[Math. 4]

$$\alpha_{CMB} = \alpha_s - \sigma_E \qquad (6)$$
$$= \alpha_s - v \cdot \omega_s$$

When the process in S30 ends, as shown in FIG. 4, in S40, estimation calculation of drift of the vehicle is performed.

Figure 6:
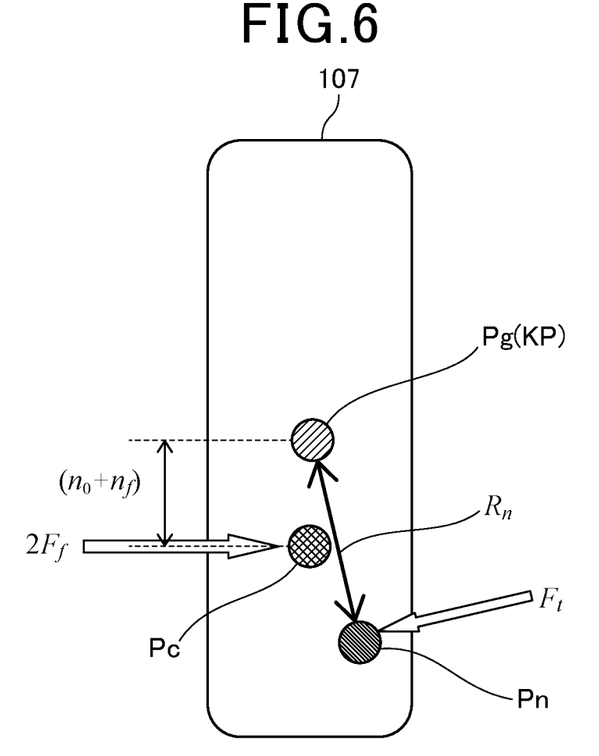
FIG. 6 is a plan view of a tire showing a ground contact point and a point of application of force.
Figure 7:
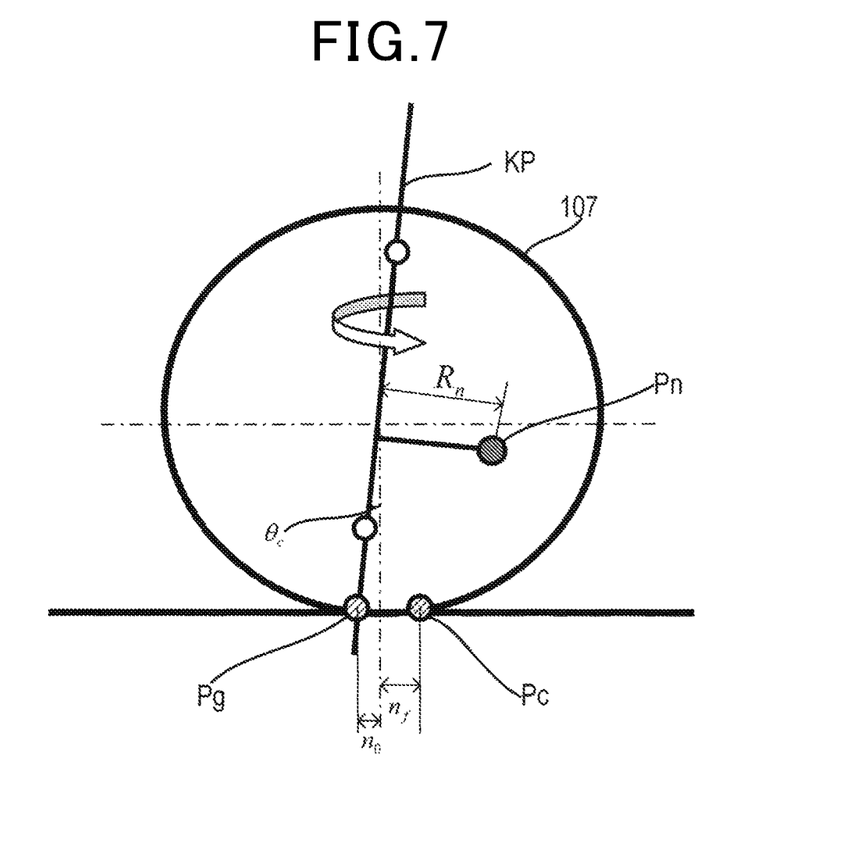
FIG. 7 is a side view of the tire showing the ground contact point and the point of application of force.

As shown in FIGS. 6 and 7, front cornering force $2 \times F_f$ acts on a point of application of force Pc of the tire 107 which is closer to a rear side than a ground contact point Pg of the tire 107 is. Tie rod axial force $F_t$ acts on a coupling point Pn of the tie rod 105 and the knuckle arm 106. A relationship between the front cornering force $2 \times F_f$ [N] and the tie rod axial force $F_t$ [N] can be obtained by a moment about a king pin axis KP and is expressed by the following equation (7). In the following equation (7), $R_n$ [m], $n_0$ [m], and $n_f$ [m] represent an effective knuckle arm radius, a caster trail when the caster angle is $\theta_c$, and a pneumatic trail, respectively.

[Math. 5]

$$2F_f(n_0+n_f)=F_t \times R_n \qquad (7)$$

Thus, the front cornering force $2 \times F_f$ [N] is expressed by the following equation (8).

[Math. 6]

$$2F_f = \frac{F_t \times R_n}{(n_0 + n_f)} \qquad (8)$$

The effective knuckle arm radius $R_n$ [m] is expressed by the following equation (9). In the following equation (9), $N_g$ [–] and $S_r$ [m/rev] represent a steering overall gear ratio and a stroke ratio, respectively.

[Math. 7]

$$R_n = \frac{S_r \times N_g}{2\pi} \qquad (9)$$

The stroke ratio $S_r$ is expressed by the following equation (10). In the following equation (10), $\theta$ and $L_r$ [m] represent the number of lock-to-lock rotations and a rack stroke, respectively.

[Math. 8]

$$S_r = \frac{L_r \times 2}{\theta} \qquad (10)$$

The tie rod axial force $F_t$ [N] is expressed by the following equation (11). In the following equation (11), MT [Nm], $\eta_w$ [–], $k_t$ [Nm/A], $I_m$ [A], iw [–], and $\eta_p$ [–] represent steering torque generated by steering of the steering wheel 101, torque transmission efficiency, a value obtained by dividing rated torque of the motor 3 by a rated electric current of the motor 3, an electric current flowing in the motor 3, a gear ratio of the motor, and efficiency of the gear mechanism made of the rack and the pinion gear of the steering gearbox 104, respectively.

[Math. 9]

$$F_t = [MT + \eta_w \times (k_t \times I_m \times iw)] \times \eta_w \times \eta_p \times \frac{2\pi}{S_r} \qquad (11)$$

Torque $T_i$ (hereinafter referred to as intermediate shaft torque $T_i$) of the intermediate shaft 103 is expressed by the following equation (12).

[Math. 10]

$$T_i=[MT+\eta_w \times (k_t \times I_m \times iw)] \qquad (12)$$

Thus, the tie rod axial force $F_t$ [N] is expressed by the following equation (13).

[Math. 11]

$$F_t = T_i \times \eta_w \times \eta_p \times \frac{2\pi}{S_r} \qquad (13)$$

Furthermore, substitution of the above equation (13) into the above equation (8) yields the following equation (14).

[Math. 12]

$$2F_f = \frac{T_i \times \eta_w \times \eta_p \times \frac{2\pi}{S_r} \times R_n}{(n_0 + n_f)} \qquad (14)$$

Next, a relationship between front wheel cornering force $F_f$ and rear wheel cornering force $F_r$ is expressed by the following equation (15). In the following equation (15), $l_f$ and $l_r$ represent a distance between a center of gravity of the vehicle and a front wheel axis and a distance between the center of gravity of the vehicle and a rear wheel axis, respectively.

[Math. 13]

$$2F_f \times l_f = 2F_r \times l_r \qquad (15)$$

The distance $l_f$ between the center of gravity of the vehicle and the front wheel axis and the distance $l_t$ between the center of gravity of the vehicle and the rear wheel axis are expressed by the following equation (16) and the following equation (17), respectively. In the following equations (16) and (17), l, $m_f$, and $m_r$ represent a wheelbase of the vehicle, a vehicle mass on a front side with respect to the center of gravity of the vehicle, and a vehicle mass on a rear side with respect to the center of gravity of the vehicle, respectively.

[Math. 14]

$$l_f = \frac{m_r}{m_f + m_r} l \qquad (16)$$

$$l_r = \frac{m_f}{m_f + m_r} l \qquad (17)$$

Furthermore, substitution of the above equations (16) and (17) into the above equation (15) yields the following equation (18). Thus, the relationship between the front wheel cornering force $F_f$ and the rear wheel cornering force $F_r$ is expressed by the following equation (19).

[Math. 15]

$$2F_f \times \frac{m_r}{m_f + m_r} = 2F_r \times \frac{m_f}{m_f + m_r} \quad (18)$$

$$2F_f \times m_r = 2F_r \times m_f \quad (19)$$

According to the above equations (14) and (19), the rear wheel cornering force $F_r$ is expressed by the following equation (20).

[Math. 16]

$$2F_r = \frac{m_r}{m_f} \frac{T_i \times \eta_w \times \eta_p \times \frac{2\pi}{S_r} \times R_n}{(n_0 + n_f)} \quad (20)$$

A relational expression of the mass of the vehicle, the lateral acceleration of the vehicle, and force $F_{cent}$ acting on the vehicle is expressed by the following equation (21). Substitution of the front wheel cornering force $F_f$ and the rear wheel cornering force $F_r$ into the force $F_{cent}$ acting on the vehicle yields the following equation (22).

[Math. 17]

$$(m_f + m_r)\ddot{y}_c = F_{cent} \quad (21)$$

$$\ddot{y}_c = \frac{2F_f + 2F_r}{m_f + m_r} \quad (22)$$

Thus, the lateral acceleration of the vehicle is expressed by the following equation (23).

[Math. 18]

$$\ddot{y}_c = \frac{1}{m_f + m_r}\left[\frac{T_i \times \eta_w \times \eta_p \times \frac{2\pi}{S_r} \times R_n}{(n_0 + n_f)} + \frac{m_r}{m_f}\frac{T_i \times \eta_w \times \eta_p \times \frac{2\pi}{S_r} \times R_n}{(n_0 + n_f)}\right] \quad (23)$$

Thus, a relationship between the lateral acceleration of the vehicle and the intermediate shaft torque $T_i$ is expressed by the following equation (24).

[Math. 19]

$$\ddot{y}_c = \frac{l + \frac{m_r}{m_f}}{m_f + m_r}\left[\frac{\eta_w \times \eta_p \times \frac{2\pi}{S_r} \times R_n}{(n_0 + n_f)}\right] \times T_i \quad (24)$$

As shown in the following equation (25), a yaw rate $\omega_{std}$ (hereinafter referred to as plane yaw rate $\omega_{std}$) when the vehicle is performing steady-state circular turning on a plane road can be calculated by dividing the lateral acceleration calculated from the intermediate shaft torque $T_i$ by a vehicle speed V.

[Math. 20]

$$\omega_{std} = \frac{\ddot{y}_c}{V} \quad (25)$$

In S40, the intermediate shaft torque $T_i$ is calculated on the basis of the value of the electric current of the motor detected by the electric current detection circuit 9, the steering torque detected by the torque sensor 2, and the above equation (12). Then, in S40, the plane yaw rate $\omega_{std}$ is calculated on the basis of the above equations (24) and (25). In S40, a yaw rate difference $\Delta\omega$ between the plane yaw rate $\omega_{std}$ and the yaw rate $\omega_S$ detected by the yaw rate sensor 6 is calculated, and lateral acceleration $\Delta a$ (hereinafter referred to as difference lateral acceleration $\Delta a$) corresponding to the yaw rate difference $\Delta\omega$ is calculated by the following equation (26).

[Math. 21]

$$\Delta\alpha = \Delta\omega \times V \quad (26)$$

In S40, an estimated angle $\theta_{std}$ corresponding to the difference lateral acceleration $\Delta a$ is calculated by the following equation (27), and the process in S40 ends.

[Math. 22]

$$\theta_{std} = \sin^{-1}\left(\frac{\Delta\alpha}{g}\right) \quad (27)$$

Next, as shown in FIG. 4, in S50, an estimated angle difference $\Delta\theta$ is calculated as shown in the following equation (28) by subtracting the camber estimated angle $\theta_G$ calculated in S30 from the estimated angle $\theta_{std}$ calculated in S40.

[Math. 23]

$$\Delta\theta = \theta_{std} - \theta_G \quad (28)$$

In S60, an average value $\theta_{ave}$ (hereinafter referred to as difference average $\theta_{ave}$) of the estimated angle differences $\Delta\theta$ calculated in S50 is calculated. Furthermore, in S70, as shown in the following equation (29), an additional value obtained by adding the camber estimated angle $\theta_G$ calculated in S30 to the difference average $\theta_{ave}$ calculated in S60 is calculated as a camber correction value $\theta_{CAL}$.

[Math. 24]

$$\theta_{CAL} = \theta_G + \theta_{AVE} \quad (29)$$

In S80, as shown in the following equation (30), the camber correction value $\theta_{CAL}$ calculated in S70 is converted into the lateral acceleration correction value $a_{CAL}$, and the road surface camber correction process ends once.

[Math. 25]

$$\alpha_{CAL} = g \times \sin\theta_{CAL} \quad (30)$$

Figure 8:
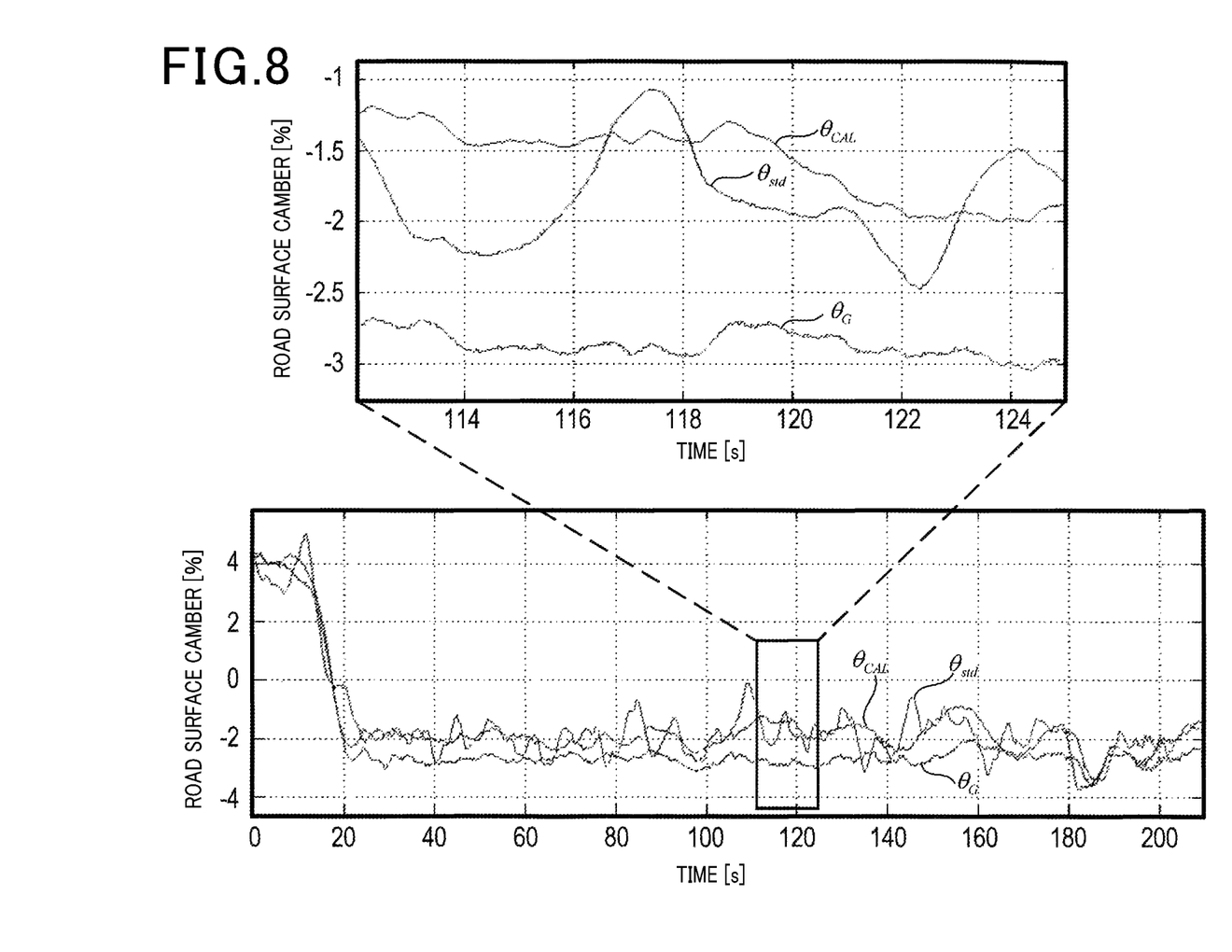
FIG. 8 is a graph showing changes over time in θG, θstd, and θCAL.

FIG. 8 is a graph showing changes over time in results of the calculation of the camber estimated angle $\theta_G$, the estimated angle $\theta_{std}$, and the camber correction value $\theta_{CAL}$. As shown in FIG. 8, the result of the calculation of the camber estimated angle $\theta_G$ is stable over time but is offset due to an effect of a zero-point shift of the acceleration sensor 7 or the like. The result of the calculation of the estimated angle $\theta_{std}$ changes over time due to an effect of a vehicle model error. Meanwhile, with regard to the result of the calculation of the camber correction value $\theta_{CAL}$, an amount of offset is decreased as compared with the camber estimated angle $\theta_G$ and an amount of change over time is decreased as compared with the estimated angle $\theta_{std}$.

According to the LKAECU 10 thus configured, the lane recognition section 21 recognizes the driving lane in which the own vehicle is traveling. The target trajectory generation section 22, the first adder 24, the feedforward steering angle calculation section 25, the feedback steering angle calculation section 26, the second adder 27, the feedforward torque calculation section 28, the feedback torque calculation section 29, and the third adder 30 calculate the demanded torque $\tau_{tgt}$ for controlling steering of the own vehicle so that deviation of the own vehicle from the driving lane is suppressed.

The road surface camber correction section 23 detects the camber estimated angle $\theta G$ which is a camber angle of the road surface of the driving lane in which the own vehicle is traveling (S30). Furthermore, the road surface camber correction section 23 detects the drift of the own vehicle by calculating the yaw rate difference $\Delta\omega$ (S40). The road surface camber correction section 23 then corrects the demanded torque $\tau$tgt on the basis of the camber estimated angle $\theta G$ and the yaw rate difference $\Delta\omega$ by calculating the lateral acceleration correction value aCAL (S60 to S80).

Thus, the LKAECU 10 detects not only the road surface camber of the driving lane but also the drift of the own vehicle. On the basis of the road surface camber and the drift, the LKAECU 10 can calculate the demanded torque $\tau_{tgt}$ for controlling steering of the own vehicle so that deviation of the own vehicle from the driving lane is suppressed. This allows the LKAECU 10 to improve lane keeping performance for suppressing deviation of the own vehicle from the driving lane and keeping the vehicle in the driving lane.

Drift of a vehicle is a phenomenon in which the vehicle moves to the right or left contrary to a driver's intention. For example, when the driver continues turning the steering wheel to the right or left although the vehicle is traveling straight on a straight flat road, drift of the vehicle has occurred. Drift of the vehicle can be caused by a side wind blowing along a width direction of the vehicle, deviation in vehicle alignment, or the like.

The LKAECU 10 detects the drift of the own vehicle on the basis of the yaw rate difference $\Delta\omega$ which is a difference between the yaw rate $\omega_S$ detected by the yaw rate sensor 6 and the plane yaw rate $\omega_{std}$ which is a yaw rate estimated on the basis of the intermediate shaft torque $T_i$ applied to the intermediate shaft 103 (S40). That is, the LKAECU 10 detects the drift of the own vehicle from torque generated when the driver performs steering so that drifting of the own vehicle due to a side wind, deviation in vehicle alignment, or the like is suppressed.

The LKAECU 10 calculates, as the estimated angle $\theta$std, a camber angle corresponding to the yaw rate difference $\Delta\omega$ (S40). The LKAECU 10 then corrects the demanded torque $\tau$tgt on the basis of the additional value (camber correction value $\theta$CAL) of the camber estimated angle $\theta G$ and the difference average Gave which is an average value of differences between the camber estimated angle $\theta G$ and the estimated angle $\theta$std (S60 to S80).

This allows the LKAECU 10 to reduce the effect of the zero-point shift of the acceleration sensor 7 or the like and the effect of the vehicle model error and calculate the demanded torque $\tau_{tgt}$ whose value is stable over time.

According to the aforementioned embodiment, the LKAECU 10 is a lane keep assist device of the present invention. The lane recognition section 21 is travel lane recognition means of the present invention.

The target trajectory generation section 22, the first adder 24, the feedforward steering angle calculation section 25, the feedback steering angle calculation section 26, the second adder 27, the feedforward torque calculation section 28, the feedback torque calculation section 29, and the third adder 30 are control amount calculation means of the present invention.

The process in S30 is camber angle detection means of the present invention. The process in S40 is drift detection means of the present invention. The processes in S60 to S80 are correction means of the present invention.

The driving lane is a travel lane of the present invention. The demanded torque $\tau$tgt is an amount of steering control of the present invention. The camber estimated angle $\theta G$ is a road surface camber angle of the present invention. The plane yaw rate $\omega$std is an estimated yaw rate of the present invention. The estimated angle $\theta$std is a drift camber angle of the present invention.

The steering wheel 101, the steering shaft 102, the intermediate shaft 103, the steering gearbox 104, the tie rods 105, and the knuckle arms 106 are a steering device of the present invention.

Although one embodiment of the present invention has been described above, the present invention is not limited to the aforementioned embodiment and can be implemented in various forms within the technical scope of the present invention.

MODIFIED EXAMPLE 1

For example, according to the aforementioned embodiment, the LKAECU 10 calculates the demanded torque $\tau_{tgt}$ and outputs the demanded torque $\tau_{tgt}$ to the EPSECU 11. However, the amount of steering control for controlling steering of the own vehicle is not limited to this.

Furthermore, it is possible to distribute functions of a single component of the aforementioned embodiment as a plurality of components or integrate functions of a plurality of components into a single component. At least part of the configuration of the aforementioned embodiment can be substituted by a publicly known configuration having a similar function. A part of the configuration of the aforementioned embodiment can be omitted. At least part of the configuration of the aforementioned embodiment can be added to or substituted by another configuration of the aforementioned embodiment. Any aspect included in a technical idea specified only by text of the claims is an embodiment of the present invention.

REFERENCE SIGNS LIST

1 . . . Travel assist system
10 . . . LKAECU
21 . . . Lane recognition section
22 . . . Target trajectory generation section
23 . . . Road surface camber correction section
24 . . . Adder
25 . . . Feedforward steering angle calculation section
26 . . . Feedback steering angle calculation section
27 . . . Adder
28 . . . Feedforward torque calculation section
29 . . . Feedback torque calculation section
30 . . . Adder

The invention claimed is:

1. A lane keep assist device comprising:
   travel lane recognition means for recognizing a travel lane in which an own vehicle is traveling;
   control amount calculation means for calculating an amount of steering control for controlling steering of the own vehicle so that deviation of the own vehicle from the travel lane recognized by the travel lane recognition means is suppressed;
   camber angle detection means for detecting a road surface camber angle which is a camber angle of a road surface of the travel lane in which the own vehicle is traveling;
   drift detection means for detecting drift of the own vehicle; and
   correction means for correcting the amount of steering control on the basis of a result of detection by the camber angle detection means and a result of detection by the drift detection means; wherein,
   the drift detection means detects the drift of the own vehicle on the basis of a yaw rate difference which is a difference between a yaw rate of the own vehicle and an estimated yaw rate which is a yaw rate estimated on the basis of torque applied to a steering device of the own vehicle.

2. The lane keep assist device as set forth in claim 1, wherein,
   the drift detection means calculates, as a drift camber angle, an angle of camber corresponding to the yaw rate difference; and
   the correction means corrects the amount of steering control on the basis of, as the result of the detection by the camber angle detection means and the drift detection means, an additional value obtained by adding the road surface camber angle detected by the camber angle detection means to an average value of differences between the road surface camber angle and the drift camber angle.

* * * * *